United States Patent
Fujioka et al.

(10) Patent No.: US 11,381,188 B2
(45) Date of Patent: Jul. 5, 2022

(54) SETTING SUPPORT DEVICE

(71) Applicant: OMRON Corporation, Kyoto (JP)

(72) Inventors: Takumi Fujioka, Ritto (JP); Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 31 days.

(21) Appl. No.: 17/261,550

(22) PCT Filed: Aug. 7, 2019

(86) PCT No.: PCT/JP2019/031250
§ 371 (c)(1),
(2) Date: Jan. 19, 2021

(87) PCT Pub. No.: WO2020/039947
PCT Pub. Date: Feb. 27, 2020

(65) Prior Publication Data
US 2021/0265934 A1    Aug. 26, 2021

(30) Foreign Application Priority Data

Aug. 21, 2018 (JP) .............................. JP2018-155012

(51) Int. Cl.
*H02P 23/00* (2016.01)
*H02P 23/14* (2006.01)

(52) U.S. Cl.
CPC .......... *H02P 23/0077* (2013.01); *H02P 23/14* (2013.01)

(58) Field of Classification Search
CPC .... H02P 23/0077; H02P 23/14; G05B 19/404
USPC ................................................. 318/767, 727
See application file for complete search history.

(56) References Cited

U.S. PATENT DOCUMENTS 6,885,163 B2 *  4/2005  Heidrich ................ H02P 6/185
                                              318/400.11

FOREIGN PATENT DOCUMENTS

| EP | 2980986 | 2/2016 |
|---|---|---|
| EP | 3139492 | 3/2017 |
| JP | 2015156194 | 8/2015 |
| JP | 2017167607 | 9/2017 |

(Continued)

OTHER PUBLICATIONS

"International Search Report (Form PCT/ISA/210) of PCT/JP2019/031250", dated Nov. 5, 2019, with English translation thereof, pp. 1-4.

(Continued)

*Primary Examiner* — David Luo
(74) *Attorney, Agent, or Firm* — JCIPRNET

(57) ABSTRACT

A setting support device according to the present invention is provided with: a first identification means that identifies an evaluation index value indicating the stability or control performance of motor control by a motor control device in each of a plurality of load device states in which a load device is in mutually different orientations or situations; a second identification means that identifies, for each control device state, a combined evaluation index value representative of the evaluation index values in the plurality of load device states, identified for that control device state by the first identification means; and a recommended-value output means that identifies and outputs a recommended value of at least one control parameter on the basis of the combined evaluation index value identified for each control device state by the second identification means.

11 Claims, 11 Drawing Sheets

(56) References Cited

FOREIGN PATENT DOCUMENTS

| | | |
|---|---|---|
| WO | 2009096169 | 8/2009 |
| WO | 2016170661 | 10/2016 |

OTHER PUBLICATIONS

"Written Opinion of the International Searching Authority (Form PCT/ISA/237) of PCT/JP2019/031250", dated Nov. 5, 2019, with English translation thereof, pp. 1-6.
"Search Report of Europe Counterpart Application", dated Apr. 19, 2022, p. 1-p. 8.

\* cited by examiner

Information presented to user

SETTING SUPPORT DEVICE

CROSS-REFERENCE TO RELATED APPLICATION

This application is a 371 application of the International PCT application serial no. PCT/JP2019/031250, filed on Aug. 7, 2019, which claims the priority benefit of Japan Patent Application No. 2018-155012, filed on Aug. 21, 2018. The entirety of each of the above-mentioned patent applications is hereby incorporated by reference herein and made a part of this specification.

TECHNICAL FIELD

The present invention relates to a setting support device supporting setting of parameter values in a motor control device.

BACKGROUND ART

In a system such as a serial link robot, mechanical parameters (an inertia and the like) of a load device of each motor vary depending on an orientation of the load device. Therefore, various control parameter values for a motor control device of each motor inside such a system have to be values with which the motor can be suitably controlled regardless of the orientation of the load device. However, all the existing technologies (for example, refer to Patent Literature 1) for setting control parameters in a motor control device are established on the premise that mechanical parameters of a load device are constant. For this reason, when setting/adjusting various control parameters of a motor control device for controlling a motor that drives a load device in which mechanical parameters vary depending on an orientation, work such as "setting/adjusting control parameter value→evaluation→changing orientation of load device→evaluation" has to be repeated over and over.

Since a mechanical parameter of a load device may also vary depending on a situation (presence or absence, variation, or the like of a load mass) of the load device, there is a demand for a technology capable of reducing a time needed for setting a parameter value in a motor control device for a motor that drives a load device in which mechanical parameters vary depending on an orientation or a situation.

CITATION LIST

Patent Literature

[Patent Literature 1]
Japanese Patent Laid-Open No. 2017-167607

SUMMARY OF INVENTION

The present invention has been made in consideration of the foregoing problems, and an objective thereof is to provide a setting support device capable of reducing a time needed for setting a parameter value in a motor control device that controls a motor that drives a load device in which mechanical parameters vary depending on an orientation or a situation.

In order to achieve the foregoing objective, according to an aspect of the present invention, there is provided a setting support device supporting setting of a control parameter in a motor control device that controls a motor that drives a load device in which mechanical parameters vary depending on an orientation or a situation. The setting support device includes a first identification means that identifies an evaluation index value indicating a stability or control performance of motor control by the motor control device in each of a plurality of load device states in which the load device is in mutually different orientations or situations for each of a plurality of control device states in which values of at least one control parameter of the motor control device are mutually different, a second identification means that identifies a combined evaluation index value representative of the evaluation index values in the plurality of load device states identified by the first identification means in the control device state thereof for each of the control device states, and a recommended value output means that identifies and outputs a recommended value for at least one control parameter on the basis of the combined evaluation index value identified for each of the control device states by the second identification means.

That is, this setting support device can calculate a combined evaluation index value that is the worst value of the evaluation index values when the load device is in various orientations or when the load device is in various situations and identify and output a recommended value for at least one control parameter from the calculated combined evaluation index value. Therefore, according to the setting support device, it is possible to reduce a time needed for setting a parameter value in the motor control device that controls the motor that drives the load device in which the mechanical parameters vary depending on an orientation or a situation. The recommended value output means of the setting support device may output (display) a recommended value to a screen of a display or may output (set) a recommended value to the motor control device.

The second identification means may identify, as the combined evaluation index value, a worst value of the evaluation index values in the plurality of load device states identified by the first identification means in the control device state thereof for each of the control device states. In addition, the first identification means may calculate each evaluation index value from an estimated result of a frequency response of a servo system including the motor control device or may calculate each evaluation index value from an actual measurement result of a frequency response of a servo system including the motor control device.

The plurality of control device states may be in a state in which at least a combination of a value of a first control parameter and a value of a second control parameter are mutually different. In addition, the setting support device may further include a calculation means that calculates a value of one or more control parameters different from both the first control parameter and the second control parameter in each control device state from the value of the first control parameter or the value of the second control parameter in each control device state.

The first control parameter may be a speed proportional gain, and the second control parameter may be a position proportional gain. In addition, the recommended value output means may calculate an evaluation value E by the following calculation expression from a value $K_{pp}$ of the position proportional gain, a value $K_{vp}$ of the speed proportional gain, and constants $q_1$ and $q_2$ in the control device state thereof for each control device state in which the combined evaluation index value identified by the second identification means satisfies a first predetermined condition, and identify and output the values $K_{pp}$ and $K_{vp}$, with which a largest evaluation value E is calculated, as the recommended value for the speed proportional gain and the recommended value for the position proportional gain.

$$E = q_1 K_{pp}^2 + q_2 K_{vp}^2 \quad \text{[Math. 1]}$$

It is preferable that the evaluation index value be a peak value of a gain peak of a positional closed loop or a speed closed loop or a gain margin or a phase margin of a positional open loop or a speed open loop.

In addition, a notch parameter recommended value output means that identifies an optimum value for a parameter of a notch filter inside the motor control device in each of the plurality of load device states; identifies, for each of the plurality of load device states, a second evaluation index value indicating a stability or control performance of motor control by the motor control device when a parameter value of the notch filter is the optimum value in each load device state; identifies, for each of the optimum values, a second combined evaluation index value representative of the second evaluation index values in which the optimum value is identified as a value of the parameter of the notch filter by the first identification means; and identifies and outputs a recommended value for the parameter of the notch filter on the basis of the second combined evaluation index value identified for each of the optimum values may be applied to the setting support device.

According to the present invention, it is possible to provide a setting support device capable of reducing a time needed for setting a parameter value in a motor control device that controls a motor that drives a load device in which mechanical parameters vary depending on an orientation or a situation.

DESCRIPTION OF EMBODIMENT

Hereinafter, an embodiment of the present invention will be described on the basis of the drawings.

Figure 1:
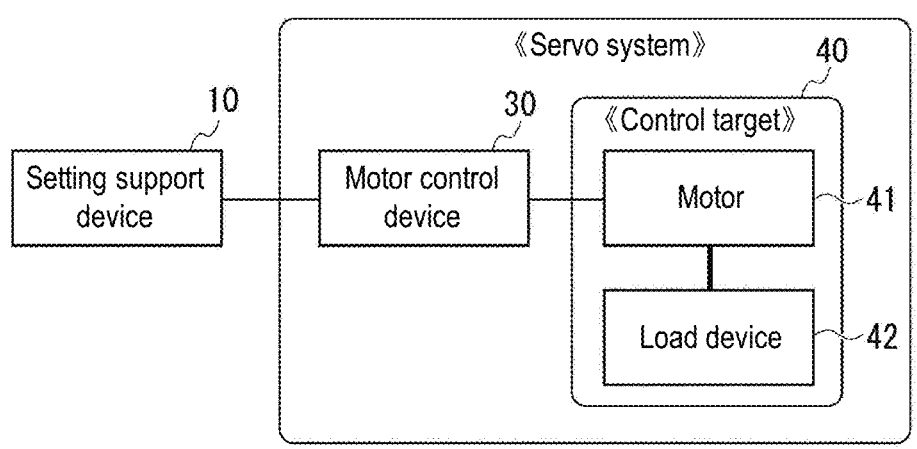
FIG. 1 is a view describing a form of using a setting support device 10 according to an embodiment of the present invention.

FIG. 1 illustrates an example of a form of using a setting support device 10 according to the embodiment of the present invention.

The setting support device 10 according to the present embodiment is a device for supporting setting of parameter values in a motor control device 30 that controls a motor 41 that drives a load device 42 in which mechanical parameters vary depending on an orientation or a situation.

The motor control device 30 is a device controlling the motor 41 in accordance with a command (a position command, a torque command, or a speed command) input from a superordinate device (not illustrated) such as a programmable logic controller (PLC). Hereinafter, a portion constituted of the motor 41 and the load device 42 will be expressed as a control target 40, and a portion constituted of the motor control device 30 and the control target 40 will be expressed as a servo system.

Figure 2:
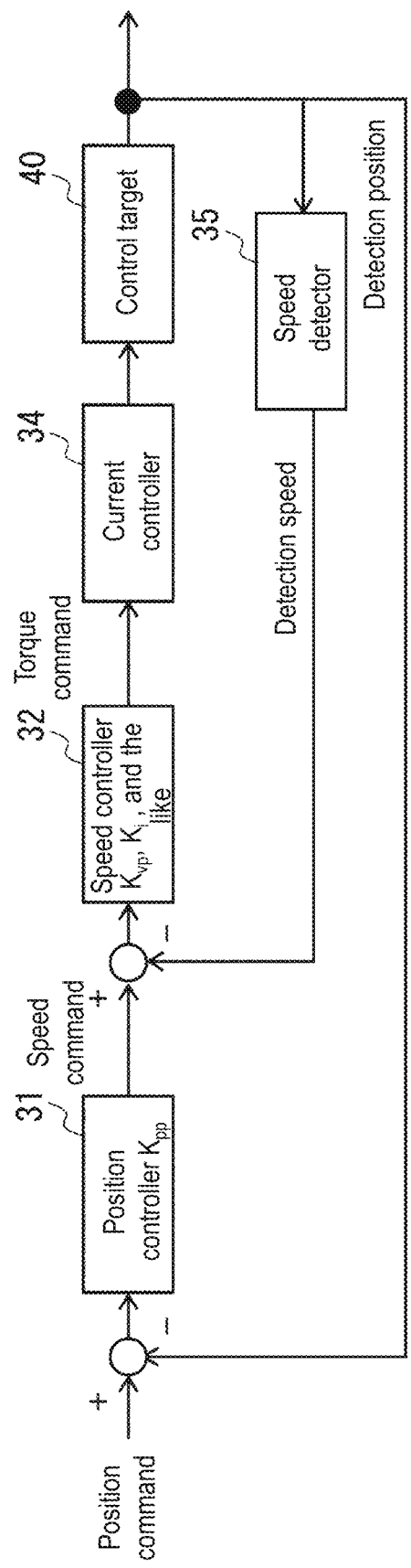
FIG. 2 is a block diagram for describing a control parameter of a motor control device.

When a position command is input from the superordinate device, as illustrated in FIG. 2, the motor control device 30 operates as a position controller 31, a speed controller 32, a current controller 34, a speed detector 35, or the like.

The speed detector 35 is a unit outputting a speed (hereinafter, a detection speed) of the control target 40 by differentiating a position (hereinafter, a detection position) of the control target 40 detected by an encoder (not illustrated) attached to the motor 41 or the load device 42.

The position controller 31 is a unit having a position proportional gain $K_{pp}$ as a control parameter. As illustrated in the diagram, a positional deviation that is a deviation between a position command and a detection position is input to this position controller 31. Further, the position controller 31 calculates and outputs a speed command that is a value obtained by multiplying the positional deviation by the position proportional gain $K_{pp}$.

The speed controller 32 is a unit performing PI control in which a speed deviation that is a deviation between a speed command and a detection speed is set as an operation amount and a torque command is set as a control amount. This speed controller 32 has a speed proportional gain $K_{vp}$ and an integration gain $K_i$ as control parameters.

In addition, the speed controller 32 includes a torque filter (low pass filter) and a notch filter capable of setting of turning on/off (whether or not to function). The torque filter inside the speed controller 32 has a cut-off frequency as a control parameter (which will hereinafter be expressed as a filter parameter), and the notch filter inside the speed controller 32 has a center frequency, a notch depth, and a Q value (=center frequency/notch width) as control parameters (which will hereinafter be expressed as filter parameters).

The current controller 34 is a unit generating a driving current according to a torque command from the speed controller 32 and supplying the driving current to a motor.

On the premise of those above, hereinafter, a configuration and operation of the setting support device 10 will be described specifically.

Figure 3:
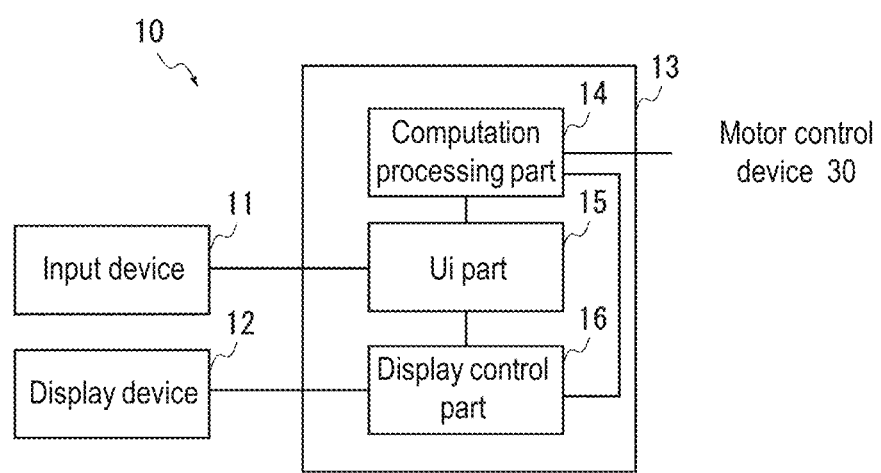
FIG. 3 is a functional block diagram of the setting support device 10.

FIG. 3 illustrates a functional block diagram of the setting support device 10. The setting support device 10 according to the present embodiment is a device in which a setting support program is installed in a personal computer (PC). As illustrated in FIG. 3, the setting support program installed in the PC causes a main body portion (a portion constituted of a CPU and peripheral devices thereto) 13 of the PC to be operated as a computation processing part 14, a UI part 15, and a display control part 16.

The display control part 16 is a functional block displaying an image of details instructed from the computation processing part 14 or the UI part 15 on a screen of a display device 12. The UI part 15 is a functional block allowing a user to designate a kind and processing conditions of processing executed by the computation processing part 14 by operating an input device 11 such as a mouse and a keyboard, and causing the computation processing part 14 to execute processing of the kind designated by the user under the processing conditions designated by the user.

The computation processing part 14 is a functional block capable of executing first setting support processing, second setting support processing, notch parameter setting support processing, and the like.

Figure 4A:
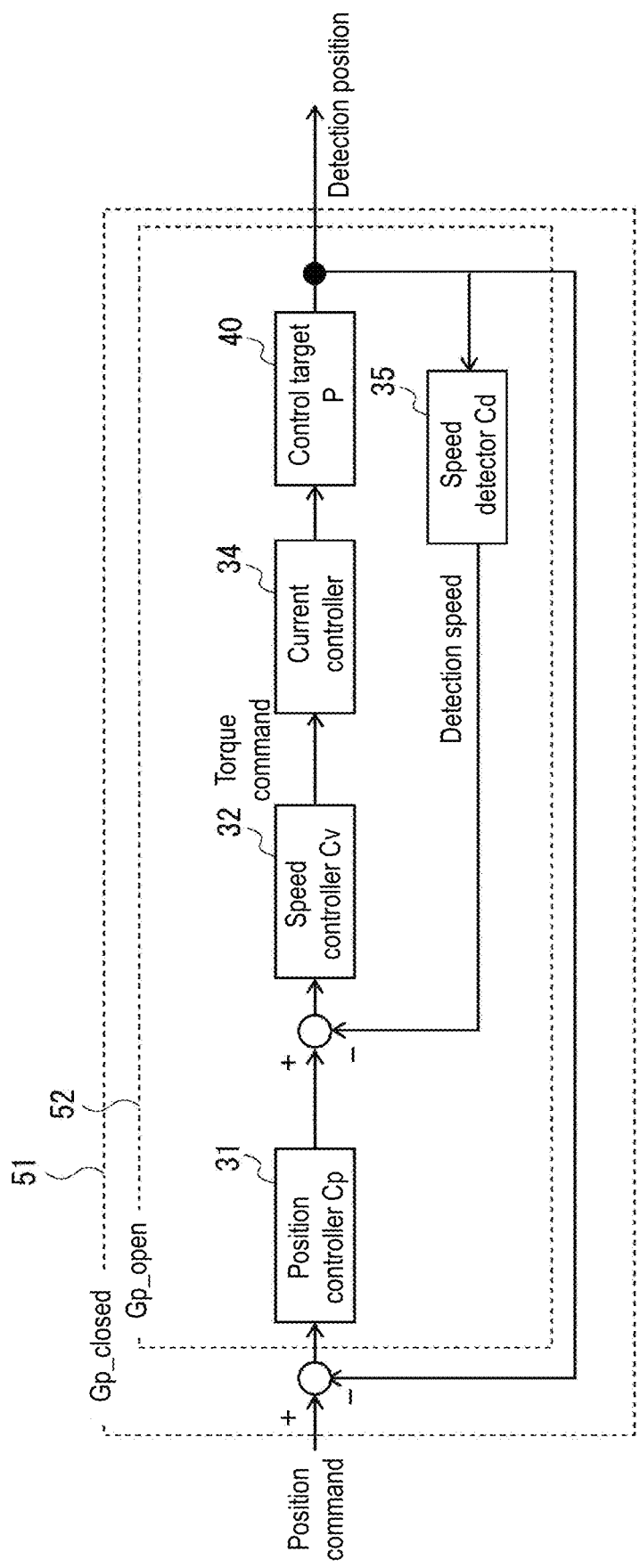
FIG. 4A is a view describing a positional closed loop characteristic Gp_closed and a positional open loop characteristic Gp_open.
Figure 4B:
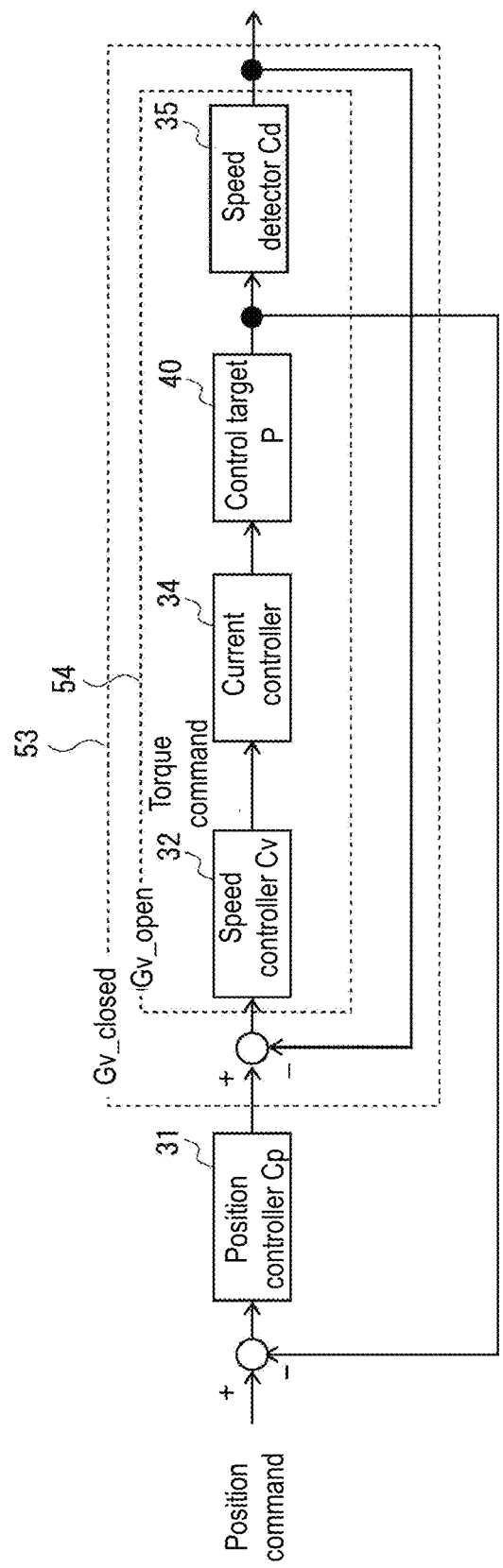
FIG. 4B is a view describing a speed closed loop characteristic Gv_closed and a speed open loop characteristic Gv_open.

Hereinafter, each step of the processing will be described in order. In the following description for each step of the processing, an orientation or a situation of the load device 42 will be simply expressed as an orientation of the load device 42. In addition, in the following description, a positional closed loop characteristic Gp_closed and a positional open loop characteristic Gp_open respectively denote frequency transfer functions of portions of the servo system indicated within dotted line frames 51 and 52 in FIG. 4A. In addition, a speed closed loop characteristic Gv_closed and a speed open loop characteristic Gv_open respectively denote frequency transfer functions of portions of the servo system indicated within dotted line frames 53 and 54 in FIG. 4B.

<<First Setting Support Processing>>

Figure 5:
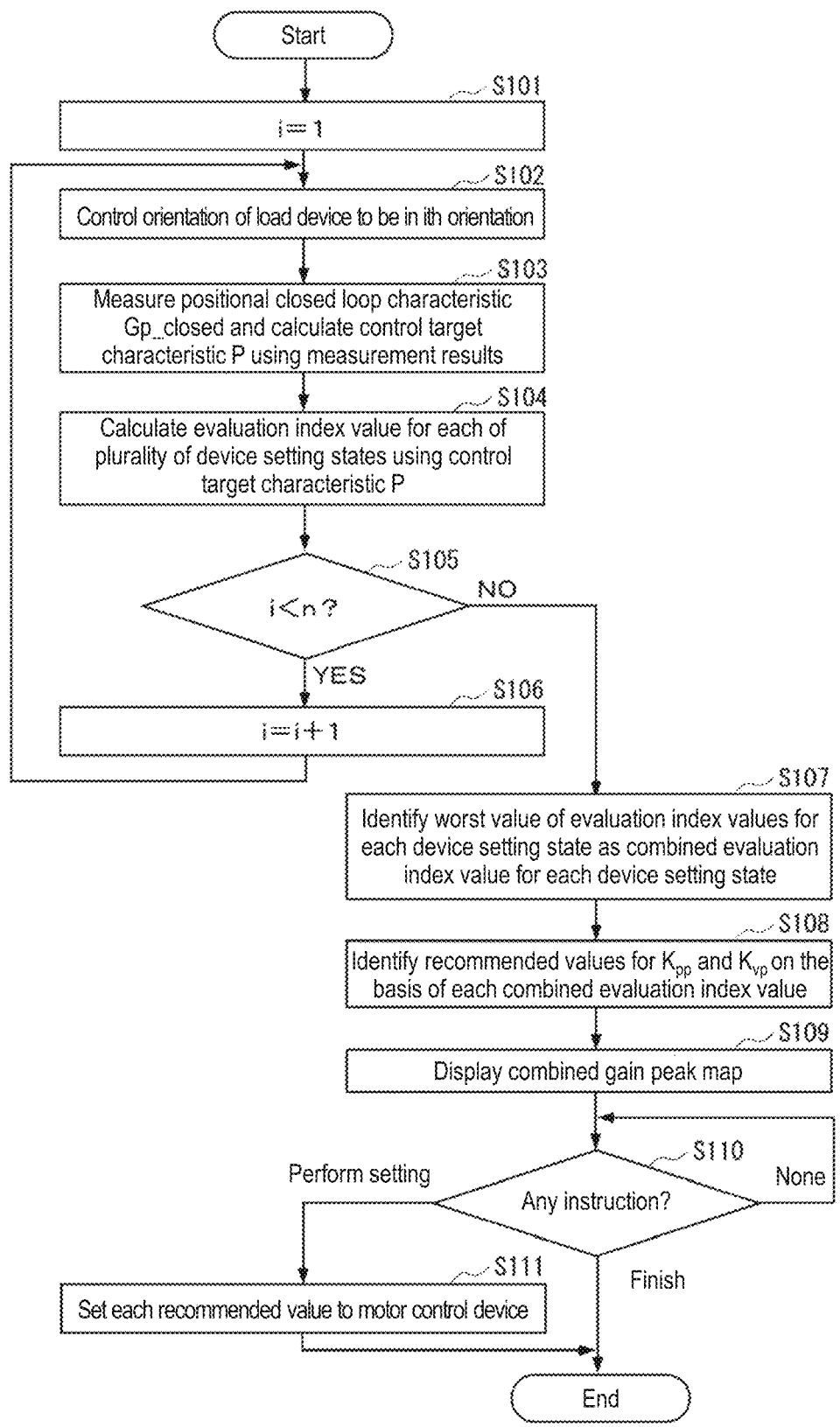
FIG. 5 is a flowchart of first setting support processing.

FIG. 5 illustrates a flowchart of the first setting support processing.

The first setting support processing is processing in which a total number n of orientations (evaluation targets) and information stipulating details of processing to be executed to have the orientation of the load device 42 within a first orientation to an nth orientation can be set as processing conditions. However, when the setting support device 10 cannot control the orientation of the load device 42 (when a user performs work of changing the orientation of the load device 42), setting of information stipulating details of processing is omitted. In addition, in Step S102 of the first setting support processing, instead of the processing which will be described below, processing of standing by for an input of information indicating that orientation work for the load device 42 has been completed is performed.

Specifically, as illustrated in the diagram, first, the computation processing part 14 which has started the first setting support processing sets "1" for a variable i (Step S101). Next, the computation processing part 14 controls the orientation of the load device 42 to be an ith orientation (Step S102). As already described, in a case or the like in which the setting support device 10 cannot control the orientation of the load device 42, in this Step S102, processing of standing by for an input of information indicating that orientation work for the load device 42 has been completed is performed.

When control of the orientation of the load device 42 for the ith orientation is completed, the computation processing part 14 measures the positional closed loop characteristic Gp_closed (arrangement of a complex number) by controlling the motor control device 30 (Step S103). This processing may be "processing in which the detection position is regularly collected while a position command that changes over time to include many frequency components is input to the motor control device 30 and the positional closed loop characteristic Gp_closed is calculated by taking a ratio through Fourier transform of the input position command and the collected detection position" or may be "processing in which the motor control device 30 is requested to measure the positional closed loop characteristic Gp_closed and a measurement result is acquired from the motor control device 30".

Further, using the measurement results, the computation processing part 14 calculates a control target characteristic P (a frequency transfer function P of the control target 40) (Step S103). More specifically, first, the computation processing part 14 identifies a characteristic (a frequency transfer function; the same applies hereinafter) Cp of the position controller 31 and a characteristic Cv of the speed controller 32 from setting values of various parameters ($K_{pp}$, $K_{vp}$, $K_i$, and filter parameters) at a time point (a measurement time point of Gv_closed) thereof. Further, the computation processing part 14 calculates the control target characteristic P from the identified characteristics Cp and Cv and characteristics Cd and Gv_closed of the speed detector 35 (refer to FIG. 4B).

In Step S104, the computation processing part 14 which has ended the processing of Step S103 calculates an evaluation index value for each of a plurality of device setting states using the control target characteristic P (Step S104). More specifically, for each of the device setting states, the computation processing part 14 repeats "processing in which the characteristics (the characteristic Cp of the position controller 31 and the characteristic Cv of the speed controller 32) of each part in the device setting state are identified; Gp_closed is calculated from the characteristics of each identified part, the characteristic Cd, and the control target characteristic P; and the evaluation index value is calculated from the calculated Gp_closed".

A plurality of control device states denotes states having a mutually different combination of the position proportional gain $K_{pp}$ and the speed proportional gain $K_{vp}$, the integration gain $K_i$ is a value obtained by multiplying the speed proportional gain $K_{vp}$ by ¼, the cut-off frequency of the torque filter is a value obtained by multiplying the speed proportional gain $K_{vp}$ by 6.8, and the filter parameter value of the notch filter is a value at a start time point of the first setting support processing. In addition, the evaluation index value denotes a gain peak value (a peak value of a gain peak) of a positional closed loop. The evaluation index value may be different information (a settling time or the like). However, it is preferable that the evaluation index value be a gain peak value of the positional closed loop or the speed closed loop, or an index value for a stability such as a gain margin or a phase margin of the positional open loop or a speed open loop.

The computation processing part 14 which has ended the processing of Step S104 determines whether or not the value i is smaller than the total number n of the evaluation target orientations (Step S105). Further, when the value i is smaller than n (Step S105; YES), the computation processing part 14 increments the value i by "1" (Step S106) and then executes the processing of Step S102 and thereafter again.

When the value i is not smaller than n (Step S105; NO), the computation processing part 14 identifies the worst value of the evaluation index values for each of the device setting states as a combined evaluation index value for each of the device setting states (Step S107). More specifically, in this Step S107, processing of searching for the worst value of n evaluation index values having different orientations of the load device and storing the searched worst value as the combined evaluation index value is performed for each of the device setting states. This processing of Step S107 may be different processing, for example, processing in which the evaluation index values for various orientations that are not identification targets for the evaluation index value are estimated from a relationship between the orientation and the evaluation index value and an estimated result of the worst evaluation index value is taken as the combined evaluation index value.

The computation processing part 14 which has ended the processing of Step S107 identifies recommended values for the position proportional gain $K_{pp}$ and the speed proportional gain $K_{vp}$ on the basis of the combined evaluation index value identified for each of the device setting states (Step S108). The processing performed in Step S108 by the computation processing part 14 according to the present embodiment is processing of calculating an evaluation value E by the following arithmetic expression for each combination of $K_{pp}$ and $K_{vp}$ having a combined evaluation index value equal to or smaller than a predetermined value (for example, 1 [dB]) and identifying a combination of $K_{pp}$ and $K_{vp}$, with which the largest evaluation value E is calculated, as the recommended values for $K_{pp}$ and $K_{vp}$.

$$E = q_1 K_{pp}^2 q_2 K_{vp}^2 \quad \text{[Math. 2]}$$

The factors $q_1$ and $q_2$ are constants set in advance.

In a certain device setting state a, if an evaluation index value when the load device 42 is taking a jth orientation is referred to as an evaluation index value #j, it is possible to state that the combined evaluation index value for the device setting state a is the worst value of the evaluation index values #1 to #n. Further, the evaluation index value (gain peak value) is a value having a positive correlation with the safety. Therefore, even if any of combinations of $K_{pp}$ and $K_{vp}$ in which the combined evaluation index value is equal to or smaller than a predetermined value is set in the motor control device 30, safety can be secured regardless of the orientation of the load device 42. Further, since both the speed proportional gain $K_{vp}$ and the integration gain $K_i$ are values having substantially a positive correlation with a track following performance, if a combination having $K_{pp}$ and $K_{vp}$ as the evaluation value E is searched for under a condition that the combined evaluation index value is a predetermined value, a stability can be ensured regardless of the orientation of the load device 42, and it is possible to identify a combination of $K_{pp}$ and $K_{vp}$ (that is, recommended values for $K_{pp}$ and $K_{vp}$) with which the maximum performance of the motor control device 30 can be brought out.

The computation processing part 14 which has ended the processing of Step S108 displays a combined gain peak map on the screen of the display device 12 utilizing the display control part 16 (Step S109).

Figure 6:
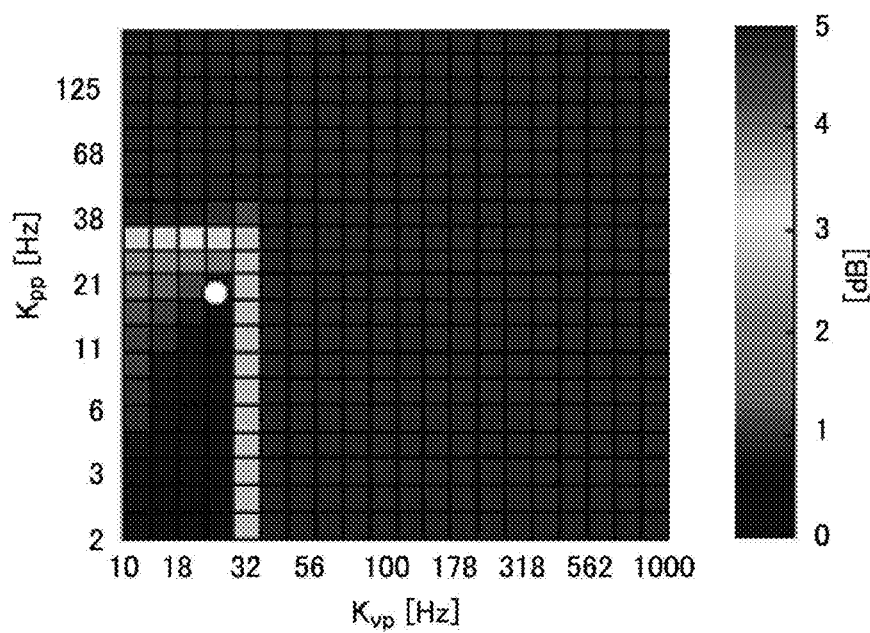
FIG. 6 is a view describing a combined gain peak map.

FIG. 6 illustrates an example of a combined gain peak map. As illustrated in the diagram, basically, in the combined gain peak map, a symbol (o) indicating a recommended value is marked on a contour diagram having colored stability index values with respect to each combination of a value of the speed proportional gain $K_{vp}$ and the position proportional gain $K_{pp}$.

The computation processing part 14 which has ended the processing of Step S109 stands by for (monitors) an input of an ending instruction or a setting instruction (Step S110; none). Further, when a setting instruction is input (Step S110; setting), the computation processing part 14 sets each recommended value (and a value calculated from each recommended value) in the motor control device 30 (Step S111), and then this first setting support processing ends. In addition, when an ending instruction is input (Step S110; ending), the computation processing part 14 ends this first setting support processing without changing each control parameter value of the motor control device 30.

<<Second Setting Support Processing>>

Hereinafter, using FIG. 5 that is a flowchart of the first setting support processing, details of the second setting support processing will be described focusing on differences between the first setting support processing and the second setting support processing.

Essentially, the second setting support processing is processing having the same details as the first setting support processing. However, the second setting support processing is processing capable of designating a plurality of control target states (a parameter for a setting target control parameter, variation of the setting target control parameter, whether or not to associate parameters other than the setting target control parameter with the setting target control parameter value, and the like). In addition, the second setting support processing can also designate the number and the kind of evaluation target values to be calculated, and in Step S104 of the second setting support processing, the kind and the number of evaluation index values designated by a user are calculated for each of the plurality of control target states designated by the user.

Specifically, for example, when a user designates the settling time as the evaluation index value and designates a control parameter A as the setting target control parameter, in Step S104, the settling time is calculated for each orientation and each control device state. Further, when a corresponding relationship between the settling time and the control device state (control parameter A value) is obtained for each of the first to third orientations (n=3) as illustrated in (A), (B), and (C) of FIG. 7, in Step S107, the worst value of the settling time in the first orientation to the third orientation is obtained for each value of the control parameter A and is adopted as the combined evaluation index value.

Figure 7:
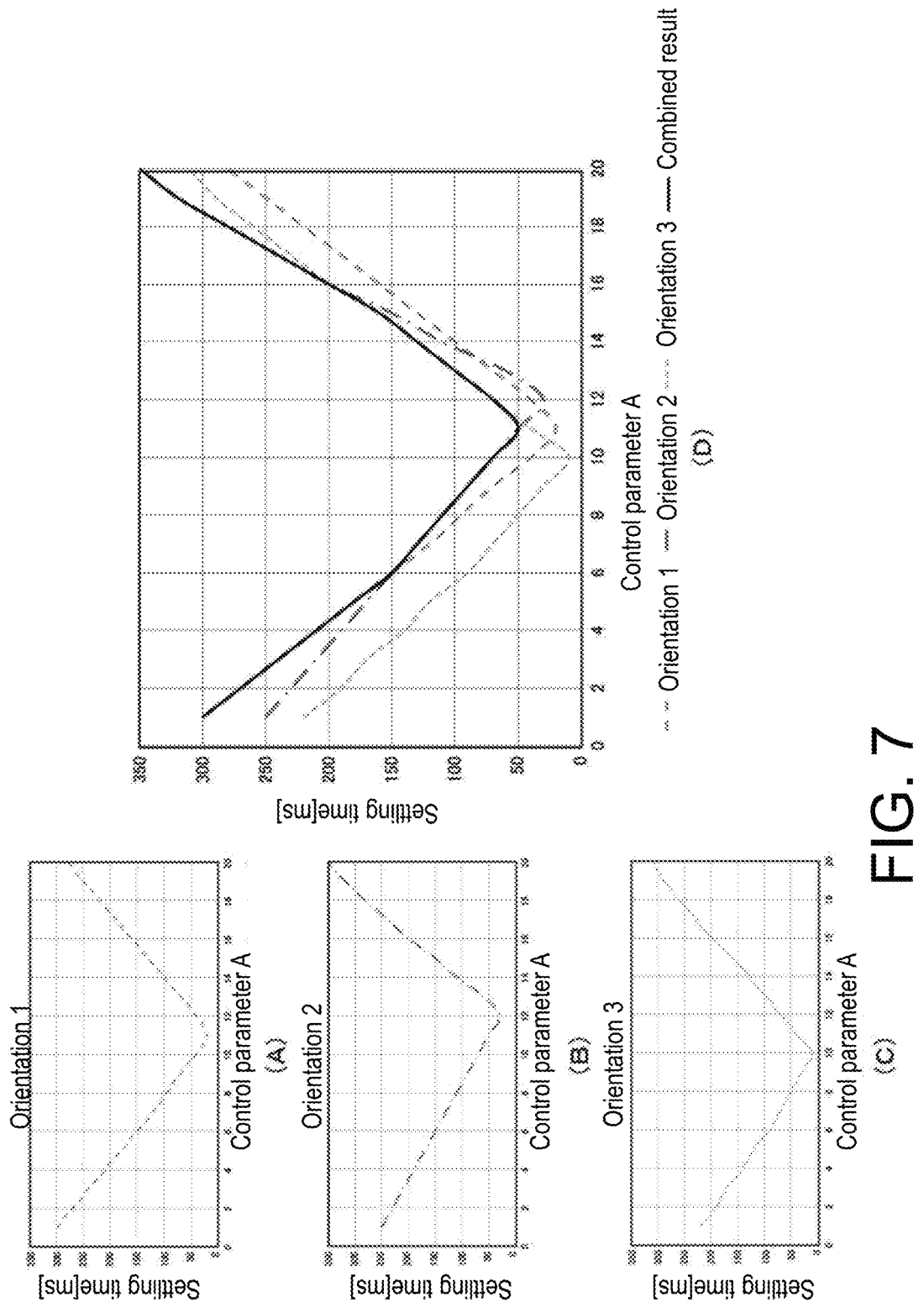
FIG. 7 is a view describing information displayed as a processing result in second setting support processing.

In addition, in the second setting support processing, the processing of Step S108 is omitted, and in Step S109, on the screen of the display device 12, a graph as illustrated in (D) of FIG. 7, that is, a graph apparently showing that an optimum value for the control parameter A is 11 is displayed. The dotted lines, the single dot dashed lines, and the broken lines indicated in this graph are lines which are not actually displayed.

In Step S110 of the second setting support processing in which only one value is designated as the evaluation index value, an operation of designating one point on the graph using a mouse or the like and an operation of a predetermined ending instruction are monitored. Further, when the former operation is performed, a value corresponding to the X coordinate of the designated point is set as the value of the control parameter A in the motor control device 30, and then the second setting support processing ends. In addition, when an operation of an ending instruction is performed, the second setting support processing simply ends.

Figure 8:
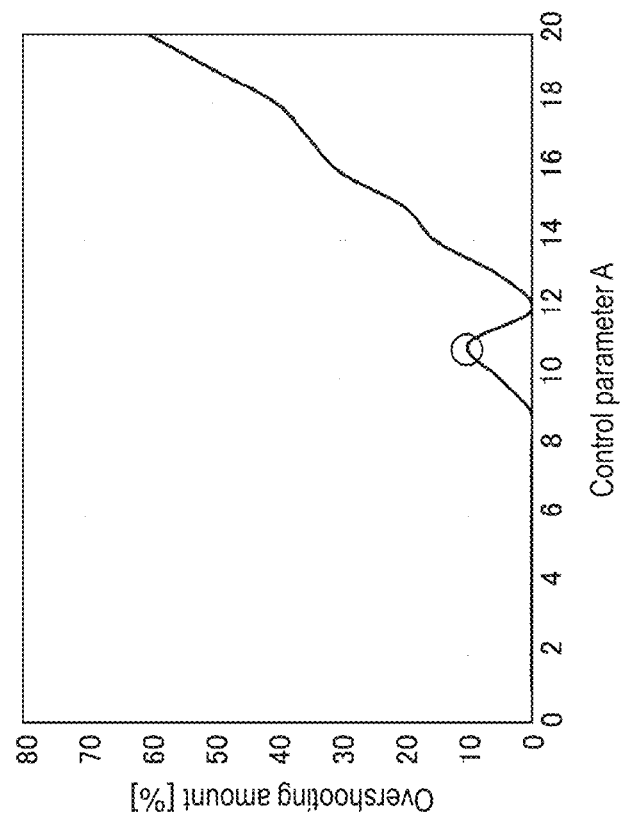
FIG. 8 is another view describing information displayed as a processing result in the second setting support processing.
Figure 8:
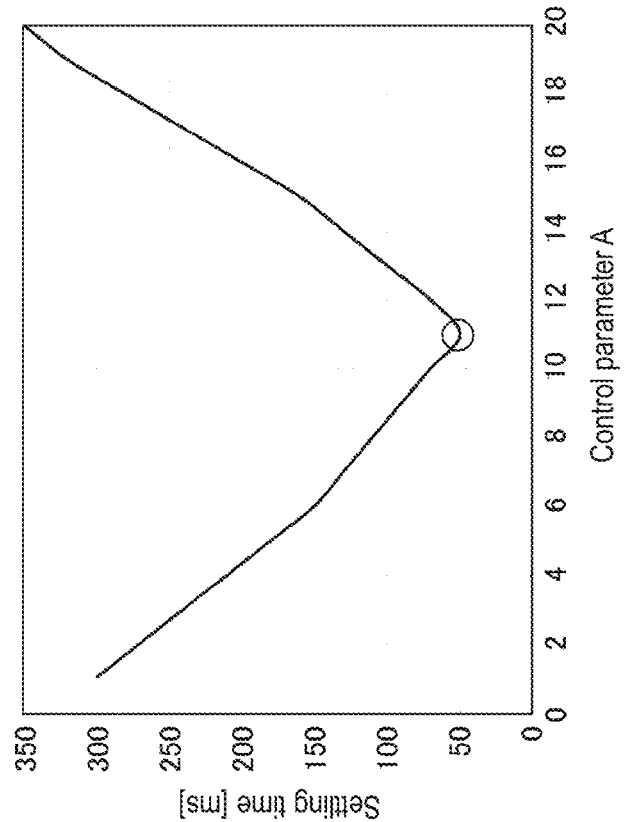

Regarding the evaluation index value, when values of a plurality of kinds, for example, the settling time and an overshooting amount are designated, in Step S104, the settling time and the overshooting amount are calculated. Further, in Step S109, as illustrated in FIG. 8, a graph for the settling time (combined settling time) and a graph for the overshooting amount (combined overshooting amount) are displayed on the screen of the display device 12. The symbol "0" on each graph indicates a pointer which operates in association with the curve within each graph. A user can easily understand the overshooting amount and the settling time when a certain value is set as the control parameter A value from the position of the pointer in the Y direction (height) on each graph.

In Step S110 of the second setting support processing in which two values are designated as the evaluation index value, an operation of designating one point on the graph using a mouse or the like and an operation of a predetermined ending instruction are monitored. Further, when the former operation is performed, a value corresponding to the X coordinate of the designated point is set as the value of the control parameter A in the motor control device 30, and then the second setting support processing ends. In addition, when an operation of an ending instruction is performed, the second setting support processing simply ends.

In addition, the second setting support processing is processing in which some evaluation index values can be calculated under the current parameter settings without any change.

When a user has instructed to evaluate the peak value of the gain peak such as the settling time and the positional closed loop under the current parameter settings without any change, in Step S104, the settling time and the peak value of the gain peak are calculated as the evaluation index value under the current parameter settings without any change.

Further, instead of the processing of Steps S108 and S109, processing of displaying the combined evaluation index value for the settling time and the peak value of the gain peak on the screen of a display is performed, and in Step S110, processing of monitoring only an input of an ending instruction is performed.

Figure 9:
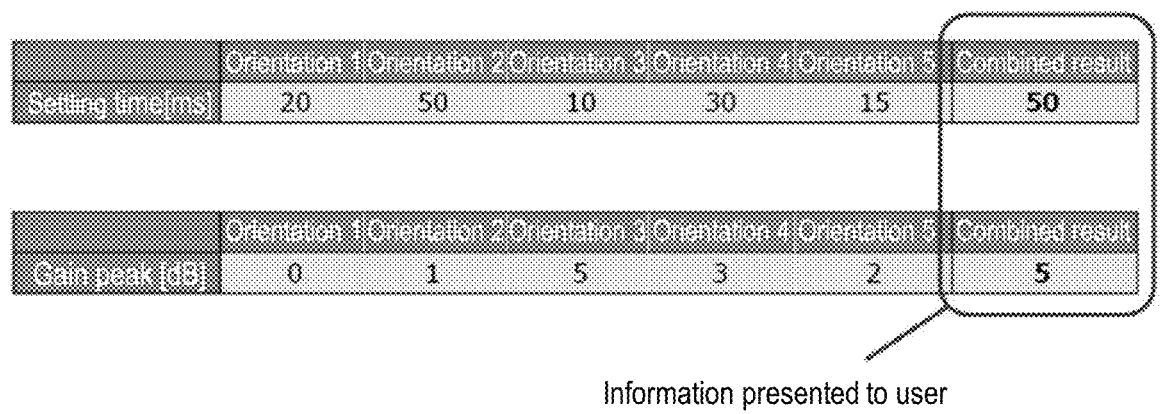
FIG. 9 is another view describing information displayed as a processing result in the second setting support processing.

When a user has instructed to evaluate the settling time and the peak value of the gain peak under the current parameter settings without any change, as illustrated in FIG. 9, the settling time and the peak value of the gain peak are calculated for each orientation, and the combined evaluation index value for each index value is also calculated. However, only the combined evaluation index value is presented to a user. Therefore, a user can judge whether or not the current settings are reasonable without struggling in finding which information is information to be focused on.

<<Notch Parameter Setting Support Processing>>

Figure 10:
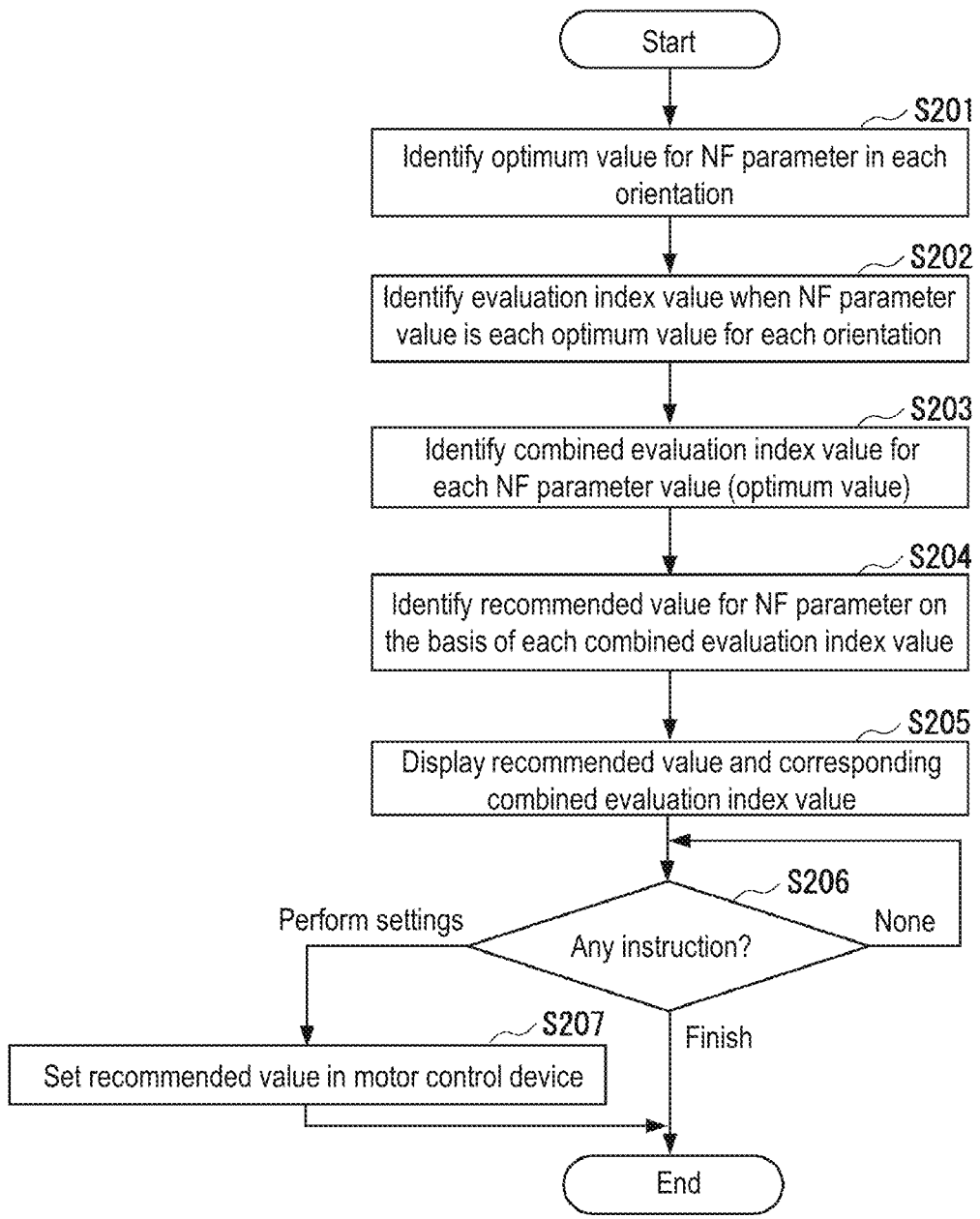
FIG. 10 is a flowchart of notch parameter setting support processing.

FIG. 10 illustrates a flowchart of the notch parameter setting support processing.

As illustrated in the diagram, first, the computation processing part 14 which has started this notch parameter setting support processing identifies optimum values for the filter parameters (the center frequency, the notch depth, and the Q value, hereinafter, NF parameters) of the notch filter in the orientation thereof for each of various orientations of the load device 42 (Step S201). This processing of Step S201 is processing in which the positional closed loop characteristic Gp_closed is measured and the foregoing optimum values are identified from the position and the shape of the resonant peak of the measurement results.

Next, the computation processing part 14 calculates the evaluation index value (in the present embodiment, the gain peak value of the positional closed loop) when the NF parameter value is each of the identified optimum values for each orientation in which the optimum value is identified (Step S202). In addition, the computation processing part 14 identifies the combined evaluation index value for each of the NF parameter values (each of the identified optimum values) (Step S203).

Thereafter, the computation processing part 14 searches for the best combined evaluation index value from the identified combined evaluation index values and identifies the NF parameter value in which the searched combined evaluation index value (hereinafter, the corresponding combined evaluation index value) is identified as the recommended value for the NF parameter (Step S204).

In subsequent Step S205, the computation processing part 14 displays the identified recommended value and the foregoing combined evaluation index value on the screen of the display device 12. Thereafter, the computation processing part 14 stands by for (monitors) an input of an ending instruction or a setting instruction (Step S206; none). Further, when a setting instruction is input (Step S206; setting), the computation processing part 14 sets the recommended value in the motor control device 30 (Step S207), and then this notch parameter setting support processing ends. In addition, when an ending instruction is input (Step S206; ending), the computation processing part 14 ends the notch parameter setting support processing without changing each parameter value of the notch filter.

As described above, the setting support device 10 according to the present embodiment can display the combined evaluation index value, which is the worst value of the evaluation index values when the load device 42 is in various orientations or the load device 42 is in various situations, on the screen of the display device 12 in various forms (FIG. 6, (D) of FIG. 7, FIG. 8, and FIG. 9). For this reason, a user of the setting support device 10 can understand whether the current control parameter value of the motor control device 30 is reasonable (causing no problem in all the orientations of the load device 42) or a favorable value for the control parameter value simply by looking at the combined evaluation index value. In addition, the setting support device 10 also has a function of calculating the recommended value and setting it in the motor control device 30. Therefore, according to the setting support device 10, it is possible to reduce a time needed for setting a parameter value in the motor control device 30 that controls the motor 41 that drives the load device 42 in which the mechanical parameters vary depending on an orientation or a situation.

In addition, the setting support device 10 also has a function of identifying an NF parameter value with which the combined evaluation index value becomes the best and outputting it as a recommended value (FIG. 10). If the combined evaluation index value becomes the best, a region (parameter value range) in which a stability (control performance when the evaluation index value is an index value for control performance) can be secured expands. Therefore, if the first setting support processing is executed after utilizing the functions, a control parameter value which can draw out substantially the maximum performance can be set in the motor control device 30.

<<Modification Form>>

The setting support device 10 can be subjected to various modifications. For example, the setting support device 10 can be modified into a device calculating each evaluation index value from an actual measurement result of the positional closed loop characteristics. In addition, a function of identifying recommended values for $K_{pp}$ and $K_{vp}$ may be applied to the notch parameter setting support processing. In addition, the first setting support processing (FIG. 5) may be modified into processing in which an index value related to control performance is also calculated in Step S104 and recommended values for $K_{pp}$ and $K_{vp}$ are identified on the basis of the index value related to control performance in Step S108.

APPENDIX

Provided is a setting support device (10) supporting setting of a control parameter in a motor control device (30) that controls a motor (41) that drives a load device (42) in which mechanical parameters vary depending on an orientation or a situation. The setting support device (10) includes a first identification means that identifies an evaluation index value indicating a stability or control performance of motor control by the motor control device (30) in each of a plurality of load device states in which the load device (42) is in mutually different orientations or situations for each of a plurality of control device states in which values of at least one control parameter of the motor control device (30) are mutually different, a second identification means (14) that identifies a combined evaluation index value representative of the evaluation index values in the plurality of load device states identified by the first identification means in the control device state thereof for each of the control device states, and a recommended value output means (14) that identifies and outputs a recommended value for at least one control parameter on the basis of the combined evaluation index value identified for each of the control device states by the second identification means.

What is claimed is:

1. A setting support device supporting setting of a control parameter in a motor control device that controls a motor that drives a load device in which mechanical parameters vary depending on an orientation or a situation, the setting support device comprising:
a first identification means that identifies an evaluation index value indicating a stability or control performance of motor control by the motor control device in each of a plurality of load device states in which the load device is in mutually different orientations or situations for each of a plurality of control device states in which values of at least one control parameter of the motor control device are mutually different;
a second identification means that identifies a combined evaluation index value representative of the evaluation index values in the plurality of load device states identified by the first identification means in the control device state thereof for each of the control device states; and
a recommended value output means that identifies and outputs a recommended value for at least one control parameter on the basis of the combined evaluation index value identified for each of the control device states by the second identification means.

2. The setting support device according to claim 1, wherein the second identification means identifies, as the combined evaluation index value, a worst value of the evaluation index values in the plurality of load device states identified by the first identification means in the control device state thereof for each of the control device states.

3. The setting support device according to claim 1, wherein the first identification means calculates each evaluation index value from an estimated result of a frequency response of a servo system comprising the motor control device.

4. The setting support device according to claim 1, wherein the first identification means calculates each evaluation index value from an actual measurement result of a frequency response of a servo system comprising the motor control device.

5. The setting support device according to claim 1, wherein the plurality of control device states is in a state in which at least a combination of a value of a first control parameter and a value of a second control parameter are mutually different.

6. The setting support device according to claim 5 further comprising:
a calculation means that calculates a value of one or more control parameters different from both the first control parameter and the second control parameter in each control device state from the value of the first control parameter or the value of the second control parameter in each control device state.

7. The setting support device according to claim 5, wherein the first control parameter is a speed proportional gain, and the second control parameter is a position proportional gain.

8. The setting support device according to claim 7, wherein the recommended value output means calculates an evaluation value E by the following calculation expression from a value $K_{pp}$ of the position proportional gain, a value $K_{vp}$ of the speed proportional gain, and constants $q_1$ and $q_2$ in the control device state thereof for each control device state in which the combined evaluation index value identified by the second identification means satisfies a first predetermined condition, and identifies and outputs the values $K_{pp}$ and $K_{vp}$, with which a largest evaluation value E is calculated, as the recommended value for the speed proportional gain and the recommended value for the position proportional gain, $$E = q_1 K_{pp}^2 + q_2 K_{vp}^2. \qquad \text{[Math. 1]}$$

9. The setting support device according to claim 1, wherein the evaluation index value is a peak value of a gain peak of a positional closed loop or a speed closed loop.

10. The setting support device according to claim 1, wherein the evaluation index value is a gain margin or a phase margin of a positional open loop or a speed open loop.

11. The setting support device according to claim 1 further comprising:
a notch parameter recommended value output means that identifies an optimum value for a parameter of a notch filter inside the motor control device in each of the plurality of load device states; identifies, for each of the plurality of load device states, a second evaluation index value indicating a stability or control performance of motor control by the motor control device when a parameter value of the notch filter is the optimum value in each load device state; identifies, for each of the optimum values, a second combined evaluation index value representative of the second evaluation index values in which the optimum value is identified as a value of the parameter of the notch filter by the first identification means; and identifies and outputs a recommended value for the parameter of the notch filter on the basis of the second combined evaluation index value identified for each of the optimum values.

* * * * *